United States Patent
Heid

(10) Patent No.: US 9,452,832 B2
(45) Date of Patent: Sep. 27, 2016

(54) TORQUE COMPENSATION FOR A HELICOPTER

(75) Inventor: Oliver Heid, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 177 days.

(21) Appl. No.: 13/812,105

(22) PCT Filed: Apr. 5, 2011

(86) PCT No.: PCT/EP2011/055259
§ 371 (c)(1),
(2), (4) Date: Jan. 24, 2013

(87) PCT Pub. No.: WO2012/013365
PCT Pub. Date: Feb. 2, 2012

(65) Prior Publication Data
US 2013/0119186 A1   May 16, 2013

(30) Foreign Application Priority Data
Jul. 26, 2010  (DE) ................. 10 2010 032 217

(51) Int. Cl.
*B64C 27/82*   (2006.01)

(52) U.S. Cl.
CPC ....... *B64C 27/82* (2013.01); *B64C 2027/8218* (2013.01); *B64C 2027/8245* (2013.01); *B64C 2027/8254* (2013.01)

(58) Field of Classification Search
CPC ...................................................... B64C 27/82
USPC ........................................... 244/17.19, 17.21
See application file for complete search history.

(56) References Cited

U.S. PATENT DOCUMENTS

| 2,473,329 | A | * | 6/1949 | Candler | 415/160 |
| 4,200,252 | A | * | 4/1980 | Logan et al. | 244/17.19 |
| 4,660,785 | A |   | 4/1987 | Munski |   |
| 4,702,437 | A | * | 10/1987 | Stearns, Jr. | 244/17.11 |
| 4,948,068 | A | * | 8/1990 | VanHorn | 244/17.19 |
| 5,174,523 | A | * | 12/1992 | Balmford | 244/17.11 |
| 5,205,512 | A | * | 4/1993 | Rumberger | 244/17.19 |
| 5,240,205 | A | * | 8/1993 | Allongue | 244/17.19 |
| 5,676,335 | A | * | 10/1997 | Murgia et al. | 244/17.19 |
| 5,934,608 | A | * | 8/1999 | Dockter | 244/17.19 |
| 6,007,021 | A | * | 12/1999 | Tsepenyuk | 244/9 |
| 6,036,141 | A | * | 3/2000 | Clay | 244/17.19 |

(Continued)

FOREIGN PATENT DOCUMENTS

| CN | 101048313 A | 10/2007 |
| DE | 4121995 C2 | 11/1992 |

(Continued)

*Primary Examiner* — Tien Dinh
*Assistant Examiner* — Michael Wang
(74) *Attorney, Agent, or Firm* — Henry M. Feiereisen LLC

(57) ABSTRACT

The invention relates to compensation for the torque which is produced by the main rotor (110) of a helicopter (100). The apparatus according to the invention for torque compensation is intended for a helicopter whose main rotor rotates about a rotation axis (RH) during operation and thus produces a torque, which acts on the fuselage (120) of the helicopter and would cause it to rotate. The apparatus comprises a lateral flow fan (200) having a housing (210) and having a rotor (220) which is mounted in the housing, wherein the lateral flow fan is arranged on the tail boom (130) of the helicopter such that it produces a thrust effect (F) during operation which compensates for the torque of the main rotor.

24 Claims, 2 Drawing Sheets

(56) References Cited

U.S. PATENT DOCUMENTS

| | | |
|---|---|---|
| 6,352,220 B1* | 3/2002 | Banks et al. ............... 244/17.19 |
| 6,464,552 B1* | 10/2002 | Streich ............................ 446/36 |
| 6,755,374 B1* | 6/2004 | Carson ....................... 244/17.19 |
| 6,863,240 B1* | 3/2005 | Namisnak .................. 244/17.19 |
| 7,735,773 B2* | 6/2010 | Schwaiger ......................... 244/9 |
| 8,528,855 B2* | 9/2013 | Seifert ............................. 244/21 |
| 2008/0093500 A1 | 4/2008 | Smith et al. |
| 2009/0140103 A1* | 6/2009 | Pendzich .................... 244/23 D |
| 2009/0277991 A1 | 11/2009 | Mikulla |
| 2012/0256042 A1* | 10/2012 | Altmikus et al. .......... 244/17.21 |
| 2012/0318910 A1* | 12/2012 | Smith .............................. 244/52 |
| 2012/0318911 A1* | 12/2012 | Robertson ....................... 244/52 |

FOREIGN PATENT DOCUMENTS

| | | |
|---|---|---|
| DE | 69028391 T2 | 4/1997 |
| DE | 102008015073 A1 | 10/2009 |
| FR | 2897040 A1 | 8/2007 |
| RU | 1621346 C | 9/1995 |
| WO | WO 00107683 A1 | 2/2000 |

* cited by examiner

TORQUE COMPENSATION FOR A HELICOPTER

CROSS-REFERENCES TO RELATED APPLICATIONS

This application is the U.S. National Stage of International Application No. PCT/EP2011/055259, filed Apr. 5, 2011, which designated the United States and has been published as International Publication No. WO 2012/013365 and which claims the priority of German Patent Application, Serial No. 10 2010 032 217.2, filed Jul. 26, 2010 pursuant to 35 U.S.C. 119(a)-(d).

BACKGROUND OF THE INVENTION

The invention relates to the compensation for the torque produced by the main rotor of a helicopter.

For the purpose of torque compensation in helicopters, use is conventionally made of axial fans, in the form of tail rotors, to compensate for the torque produced by the main rotor. Here, the tail rotor attached to the tail boom of the helicopter produces a thrust which is directed horizontally, that is as far as possible perpendicular to the vertical axis, in order to counteract the turning of the fuselage about the vertical axis.

Tail rotors of this type are predominantly arranged unshrouded on the boom, and thus present a safety risk, for example for people on the ground. For the purpose of solving this problem and other disadvantages of unshrouded tail rotors, an enclosed tail rotor is proposed in DE 102008015073 A1, a so-called Fenestron (fan tail), with which not only can the safety risk be lowered but also, for example, the noise generation and vibrations can be reduced, because the tips of the blades do not circulate in the open.

However, a disadvantageous effect is that the shrouding results in a higher weight and higher construction costs. Furthermore, such types of tail rotors are comparatively small in size, which does however have the consequence that a higher energy requirement arises for the torque compensation.

SUMMARY OF THE INVENTION

It is therefore the object of the present invention to specify an alternative possibility for torque compensation on a helicopter.

This object is achieved by the inventions specified in the independent claims. Advantageous embodiments emerge from the dependent claims.

With the inventive solution use is made of a cross-flow fan, rather than the usual axial fans, as the thrust generator to effect the torque compensation. The axis of rotation of the cross-flow fan is here expediently parallel to the long axis of the fuselage, or the long axis of the helicopter boom.

The inventive device for torque compensation, in a helicopter which has a main rotor which, in operation, rotates about an axis of rotation and thereby produces a torque, incorporates a cross-flow fan with a housing and a rotor mounted in the housing, wherein the cross-flow fan is arranged on a boom on the helicopter, in particular on the tail boom, in such a way that in operation it has a thrusting effect which compensates for the torque of the main rotor.

The cross-flow fan is arranged on the boom in such a way that, in operation, it produces a thrust in a direction which has at least a component perpendicular to the axis of rotation of the main rotor. Ideally, the entire direction of the thrust, i.e. not only a component of it, is oriented perpendicularly to the axis of rotation of the main rotor.

Furthermore, the cross-flow fan is arranged on the boom in such a way that, in operation, it produces a thrust in a direction which has at least a component perpendicular to the longitudinal axis of the boom. Ideally, the entire direction of the thrust, i.e. not only a component of it, is oriented perpendicularly to the longitudinal axis of the boom.

An arrangement of this type for the cross-flow fan ensures that the torque produced by the thrust from the cross-flow fan most effectively counteracts the torque produced by the main rotor.

The cross-flow fan can be integrated into the boom. For example, the rotor can be drum-like and the boom cylindrical in shape, so that the rotor can be fully integrated into the boom. Unlike an unshrouded or enclosed tail rotor, the thrust generator can then be better integrated into the fuselage shape.

Here, an appropriate section of the boom can form the housing of the cross-flow fan. In other words, a suitable section of the boom is fitted out in such a way that it reliably achieves the functioning of the actual housing for the cross-flow fan. This essentially means that fixtures must be provided in the boom for mounting the rotor, together with input and output openings for the air stream or thrust, as applicable, which can be produced by the fan. The fan thus does not require its own explicit or separate housing, so that material and weight savings can be made.

For this purpose, the boom has a hollow space which is delimited by walls which form the housing for the cross-flow fan.

Alternatively, the cross-flow fan can also be attached to the boom externally.

A helicopter in accordance with the invention is distinguished by the fact that it has the inventive fixtures described above.

In an inventive method for torque compensation in a helicopter, by which a torque which is produced when the helicopter's main rotor is rotating is compensated, there is attached to a boom on the helicopter, in particular the tail boom, a cross-flow fan which, in operation, produces a thrust effect which compensates the torque from the main rotor.

In operation, the cross-flow fan produces a thrust in a direction which has at least a component perpendicular to the axis of rotation of the main rotor. Ideally, it is not merely a component of the direction of thrust but rather the entire thrust which is oriented perpendicularly to the axis of rotation of the main rotor.

Further, in operation the cross-flow fan produces a thrust in a direction which has at least a component perpendicular to the longitudinal axis of the boom. Here again, it is ideally not merely a component of the thrust direction but rather the entire thrust which is oriented perpendicularly to the longitudinal axis of the boom.

In addition to the advantages mentioned above, the inventive use of a cross-flow fan enables better flow characteristics to be achieved for an obliquely incident airflow, such as arises for example from forward flight (in this connection see DE 4121995 C2). Over and above this, a significant noise reduction is achieved because the periodically unstable airflow interaction with the main rotor is lower with this system.

BRIEF DESCRIPTION OF THE DRAWING

Further advantages, features and details of the invention emerge from the exemplary embodiments described below, and by reference to the drawings.

These show.

DETAILED DESCRIPTION OF PREFERRED EMBODIMENTS

Figure 1:
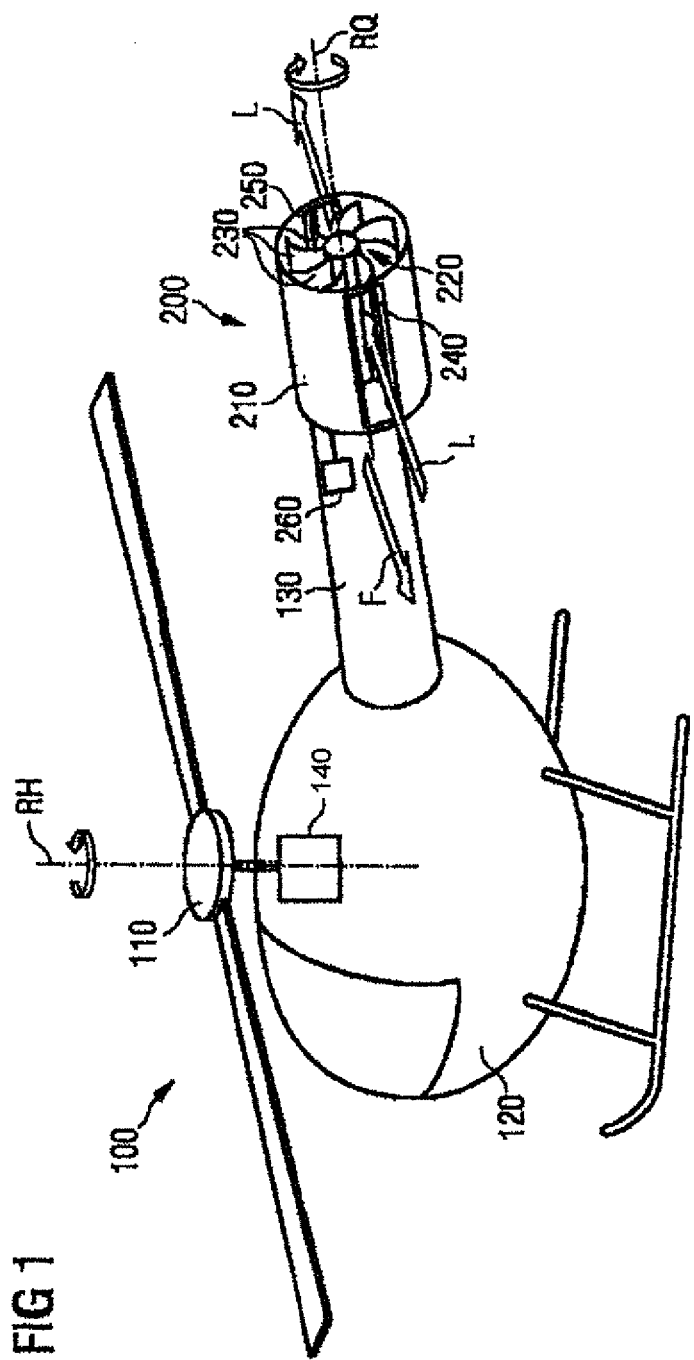
FIG. 1 a helicopter with a cross-flow fan attached to the tail boom.

FIG. 1 shows a helicopter 100 which, in accordance with the invention, is equipped with a cross-flow fan 200. The helicopter 100 has a main rotor 110 for producing the lift and/or propulsion forces for flight. In operation, i.e. when the main rotor 110 is in rotation, it rotates about an axis of rotation RH and in doing so produces a torque in the known way. Without appropriate compensation, this would have the effect that the fuselage 120 of the helicopter 100 would also rotate about the axis of rotation RH.

According to the invention, the torque compensation is not effected by a tail rotor provided on the tail boom 130 of the helicopter 100, but rather by a cross-flow fan 200. This is distinguished from a tail rotor constructed as a propeller or the like, for example, in that the airflow L produced by the fan is forced away at an angle, in particular perpendicularly, to the axis of rotation RQ of the fan 200. Accordingly, the thrust effected by the airflow L is oriented at an angle to the axis of rotation RQ of the fan 200. A propeller, on the other hand, produces an airflow parallel to its axis of rotation, or an axial thrust, as applicable.

The cross-flow fan 200 consists essentially of a housing 210 and a drum-shaped rotor 220 with numerous blades 230, accommodated in the housing in such a way that it can rotate. As shown in FIG. 1, the housing is attached on the rear of the boom 130 of the helicopter 100.

The housing 210 has on each of two opposite sides an opening 240, 250, which is for example slot-shaped. In the operating state, a drive 260 sets the rotor 220 in rotation about the axis of rotation RQ. Air is then sucked in through the first opening 240 and then forced out again through the second opening 250, so that ultimately an airflow L is produced and a thrust or force F is exerted on the fan 200, and hence on the boom 130, which is in the opposite direction to the airflow.

Hence a cross-flow fan 200 of this type, provided on the tail boom 130 of the helicopter 100, has the effect that a force F can be exerted on the boom 130 in the direction shown by the arrow, the consequence of which is corresponding torque on the fuselage 120 of the helicopter 100, by which the torque produced by the rotating main rotor 110 can be compensated.

In the ideal situation, the cross-flow fan 200 is constructed and attached to the tail boom 130 in such a way that its axis of rotation RQ is oriented perpendicularly to the axis of rotation RH of the main rotor 110 or, as applicable, the direction of the airflow L which is produced is oriented perpendicularly to the axis of rotation RH of the main rotor 110 and perpendicularly to the longitudinal axis of the boom 130.

It is important for the most efficient possible operation that the direction of the force F produced by the cross-flow fan 200 has the largest possible component in a direction which is oriented both perpendicularly to the longitudinal axis of the boom 130 and also perpendicularly to the axis of rotation RH of the main rotor 110, because the corresponding torque for compensating the torque of the main rotor is then a maximum.

Figure 2:
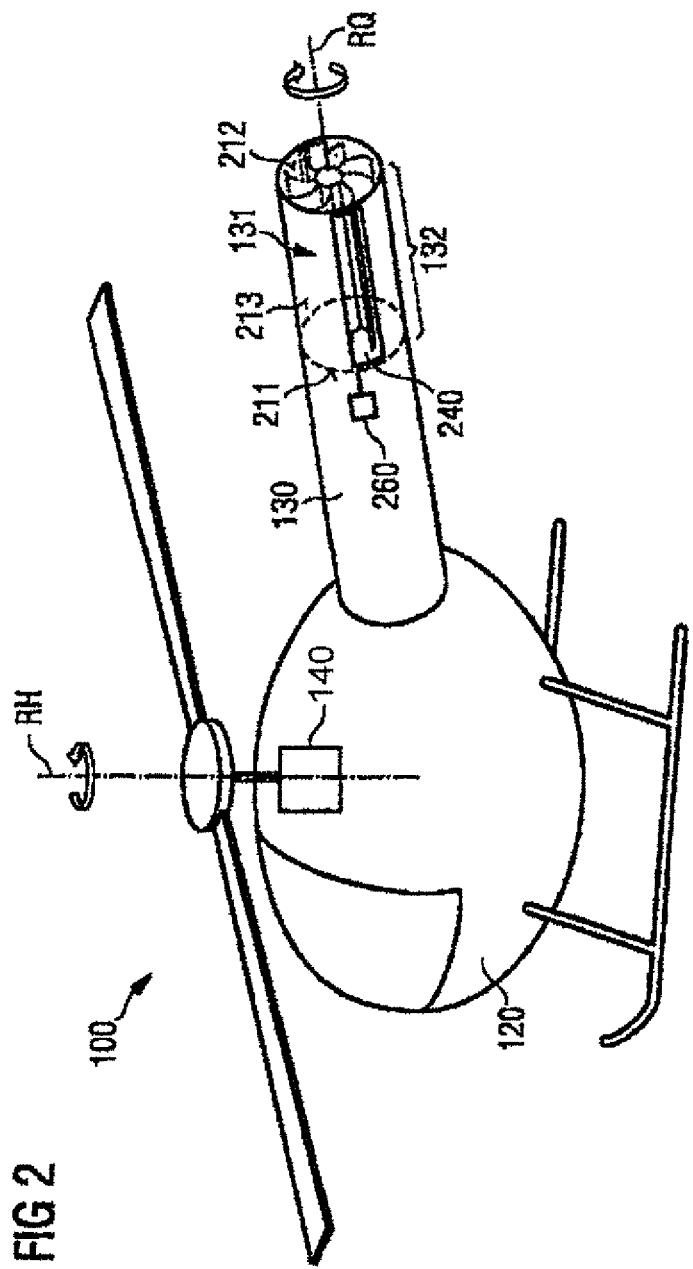
FIG. 2 a helicopter with a cross-flow fan integrated into the tail boom.

Since it is not unusual to construct the boom 130 on a helicopter 100 essentially as a hollow cylinder, the cross-flow fan 200 can also, as indicated in FIG. 2, be integrated into the boom 130, or into an appropriate hollow space 131 in the boom 130, as appropriate. For the situation in which the hollow space 131 has a suitable internal cross section, which matches the area of the rotor 220 of the cross-flow fan 200, this section 132 of the boom 130 can form the housing 210 for the cross-flow fan 200. The fan 200 thus does not require its own explicit or separate housing 210, so that material and weight savings can be made.

The boom 130 of the helicopter 100 will then ideally be constructed in such a way that it has a hollow space 131 with an internal cross section and a length which matches the external dimensions of the rotor 220 of the cross-flow fan 200 and in which can be accommodated the rotor 220 of the cross-flow fan 200. The appropriate section 132 of the boom 130, or the walls which delimit the hollow space 131, as applicable, comprising two end walls 211, 212 and a lateral surface 213 then form the housing 210 of the cross-flow fan 200. In FIG. 2, the rotor 220 together with its blades 230 are shown by dashed lines, because these components are of course not visible because of the end wall 212. The same applies for the end wall 211.

The minimum internal diameter of the hollow space 131 will, for example, be chosen such that the blades 230 of the rotor 220 only just do not touch the inner wall of the hollow space 131. Here it is, of course, necessary to take into consideration certain tolerances, for example due to temperature effects.

The drive 260 for the rotor 220 of the cross-flow fan 200 can be an electric motor or the like. Also conceivable is the use of the drive 140 of the main rotor 110 to operate in addition the cross-flow fan 200, which might then necessitate additional direction-change gearing and/or step up/down gearing (not shown), depending on the layout.

The openings 240, 250 need not, of course, lie directly opposite each other, nor need they be slot-shaped. The precise layout and dimensioning of the housing 210 can, for example, be determined with the help of simulations.

The cross-flow fan 200 can also be arranged outside the tail boom 130, for example on or under the tail boom 130. Here, an arrangement under the tail boom should be preferred, because then the interaction with the main rotor 110 would be minimized.

The invention claimed is:

1. A device for torque compensation for a helicopter having a fuselage and a tail boom, comprising:
   a main rotor which is arranged on the fuselage of the helicopter and which, in operation, rotates about an axis of rotation of the rotor and thereby produces a torque; and
   a cross-flow fan having a housing and a rotor mounted in the housing and an axis of rotation which is transverse to the axis of rotation of the main rotor, said cross-flow fan being arranged on an end of the tail boom which faces away from the fuselage of the helicopter such as to have in operation an airflow forced away at an angle to an axis of rotation of the cross-flow fan and thereby to produce a thrusting effect which compensates for a torque of the main rotor,
   wherein the housing of the cross-flow fan has two elongated openings which extend in a direction of rotation of the axis of rotation of the cross-flow fan and are provided at opposite sides of the axis of rotation of the cross-flow fan as considered in a direction transverse to the axis of rotation of the cross-flow fan, such that air is sucked in through one of the elongated openings, passes through an interior of the housing of the cross-flow fan, and is forced out through the other elongated opening, and thereby the produced airflow is transverse to the axis of rotation of the main rotor and transverse to the axis of rotation of the cross-flow fan.

2. The device of claim 1, wherein the cross-flow fan is arranged on the boom such as to produce in operation a thrust in a direction which has at least a component perpendicular to the axis of rotation of the main rotor.

3. The device of claim 1, wherein the cross-flow fan is arranged on the boom such as to produce in operation a thrust in a direction which is oriented perpendicularly to the axis of rotation of the main rotor.

4. The device of claim 1, wherein the cross-flow fan is arranged on the boom such as to produce in operation a thrust in a direction which has at least a component perpendicular to a longitudinal axis of the boom.

5. The device of claim 1, wherein the cross-flow fan is arranged on the boom such as to produce in operation a thrust in a direction which is oriented perpendicularly to a longitudinal axis of the boom.

6. The device of claim 1, wherein the cross-flow fan is integrated into the boom.

7. The device of claim 1, wherein the cross-flow fan has a housing which is formed by a section of the boom.

8. The device of claim 7, wherein the housing of the cross-flow fan is formed by walls of the boom, with the walls delimiting a hollow space.

9. The device of claim 1, wherein the cross-flow fan is provided with a drive which is separate from the drive of the main rotor, and wherein the housing of the cross-flow fan, the rotor of the cross-flow fan, and the drive of the cross-flow fan together form a unit which is attachable as a whole to the end of the tail boom of the helicopter.

10. A helicopter, comprising:
a fuselage and a tail boom; and
a device for torque compensation for a helicopter, said device including a main rotor which is arranged on the fuselage of the helicopter and which, in operation, rotates about an axis of rotation of the rotor and thereby produces a torque, and a cross-flow fan having a housing and a rotor mounted in the housing and having an axis of rotation which is transverse to the axis of rotation of the main rotor, said cross-flow fan being arranged on an end of the tail boom which faces away from the fuselage such as to have in operation an airflow oriented at an angle to an axis of rotation of the cross-flow fan and thereby to produce a thrusting effect which compensates for a torque of the main rotor,
wherein the housing of the cross-flow fan has two elongated openings which extend in a direction of the axis of rotation of the cross-flow fan and are provided at opposite sides of the axis of rotation of the cross-flow fan as considered in a direction transverse to the axis of rotation of the cross-flow fan, such that air is sucked in through one of the elongated openings, passes through the interior of the housing of the cross-flow fan and is forced out through the other elongated opening and thereby the produced air flow is transverse to the axis of rotation of the main rotor and transverse to the axis of rotation of the cross-flow fan.

11. The helicopter of claim 10, wherein the cross-flow fan is arranged on the boom such as to produce in operation a thrust in a direction which has at least a component perpendicular to the axis of rotation of the main rotor.

12. The helicopter of claim 10, wherein the cross-flow fan is arranged on the boom such as to produce in operation a thrust in a direction which is oriented perpendicularly to the axis of rotation of the main rotor.

13. The helicopter of claim 10, wherein the cross-flow fan is arranged on the boom such as to produce in operation a thrust in a direction which has at least a component perpendicular to a longitudinal axis of the boom.

14. The helicopter of claim 10, wherein the cross-flow fan is arranged on the boom such as to produce in operation a thrust in a direction which is oriented perpendicularly to a longitudinal axis of the boom.

15. The helicopter of claim 10, wherein the cross-flow fan is integrated into the boom.

16. The helicopter of claim 10, wherein the cross-flow fan has a housing which is formed by a section of the boom.

17. The helicopter of claim 16, wherein the housing of the cross-flow fan is formed by walls of the boom, with the walls delimiting a hollow space.

18. The helicopter of claim 10, wherein the cross-flow fan is provided with a drive which is separate from the drive of the main rotor, and wherein the housing of the cross-flow fan, the rotor of the cross-flow fan, and the drive of the cross-flow fan together form a unit which is attachable as a whole to the end of the tail boom of the helicopter.

19. A method for torque compensation on a helicopter, said method comprising:
arranging on a fuselage a main rotor rotatable about an axis of rotation,
attaching a cross-flow fan having a housing, a rotor rotatable in the housing, and an axis of rotation transverse to the axis of rotation of the main rotor, to an end of a tail boom of the helicopter which faces away from a fuselage; and
operating the cross-flow fan so that air is sucked in through one elongated opening of the housing, passes through an interior of the housing and is forced out through another transversely opposite elongated opening of the housing to produce an airflow transversely to the axis of rotation of the main rotor and to an axis of rotation of the cross-flow fan and thereby to produce a thrusting effect which compensates a torque caused by the rotating main rotor of the helicopter.

20. The method of claim 19, wherein the cross-flow fan produces in operation a thrust in a direction which has at least a component perpendicular to the axis of rotation of the main rotor.

21. The method of claim 19, wherein the cross-flow fan produces in operation a thrust in a direction which is oriented perpendicularly to an axis of rotation of the main rotor.

22. The method of claim 19, wherein the cross-flow fan produces in operation a thrust in a direction which has at least a component perpendicular to a longitudinal axis of the boom.

23. The method of claim 19, wherein the cross-flow fan produces in operation a thrust in a direction which is oriented perpendicularly to a longitudinal axis of the boom.

24. The method of claim 19, further comprising driving the cross-flow fan by a drive which is separate from a drive of the main rotor, and attaching a separate unit composed of the housing, the rotor, and the drive of the cross-flow fan as a whole to the end of the tail boom of the helicopter.

* * * * *